United States Patent [19]

Milliken

[11] Patent Number: 4,994,800
[45] Date of Patent: Feb. 19, 1991

[54] SNAP-IN HOUSING FOR BACKUP ALARM

[76] Inventor: Franklin L. Milliken, 1154 Everett Ct., Concord, Calif. 94518

[21] Appl. No.: 314,193

[22] Filed: Feb. 21, 1989

[51] Int. Cl.$^5$ ............................ G08G 1/00; B60Q 7/00
[52] U.S. Cl. .................................. 340/901; 340/431; 340/463; 340/473; 340/904; 381/86
[58] Field of Search ............... 340/473, 463, 693, 431, 340/471, 472, 901, 903, 904, 905; 181/141, 150; 381/86; 361/395, 399, 346; 248/27.1

[56] References Cited

U.S. PATENT DOCUMENTS

| | | | |
|---|---|---|---|
| 887,602 | 5/1908 | Dorey | 312/9 |
| 1,119,702 | 12/1914 | Infeld | 312/9 |
| 2,904,617 | 9/1959 | King | 248/27.1 |
| 3,076,960 | 2/1963 | Knutson | 340/463 |
| 3,818,438 | 6/1974 | Stacha | 340/463 |
| 3,943,507 | 4/1976 | Neal | 340/463 |
| 4,015,232 | 3/1977 | Sindle | 340/904 |
| 4,210,951 | 7/1980 | Ritter | 361/395 |
| 4,626,850 | 12/1986 | Chey | 340/904 |
| 4,636,997 | 1/1987 | Toyama et al. | 340/904 |
| 4,803,488 | 2/1989 | Dombrowski | 340/901 |

Primary Examiner—Reinhard J. Eisenzopf
Assistant Examiner—Kinfe-Michael Negash
Attorney, Agent, or Firm—Schroeder, Davis & Orliss Inc.

[57] ABSTRACT

An improved housing for an electrically operated vehicle backup alarm for mounting on a vehicle bumper or other structural component in preformed, standard size receptacles. A tubular body fabricated of plastic or nylon composite includes internal mounting lugs for removeably mounting modular electronic components and sound transducer. A removable rear cover and epoxy potting material seals the alarm components against dirt and moisture intrusion. Resilient mounting lugs or fingers external to the housing allow the housing to be mounted within preformed mounting receptacles. The mounting lugs or fingers are deformed slightly when the housing is inserted into the mounting receptacle and snapped into engagement with the edges of the mounting receptacle securely holding the housing in place within the mounting receptacle.

20 Claims, 4 Drawing Sheets

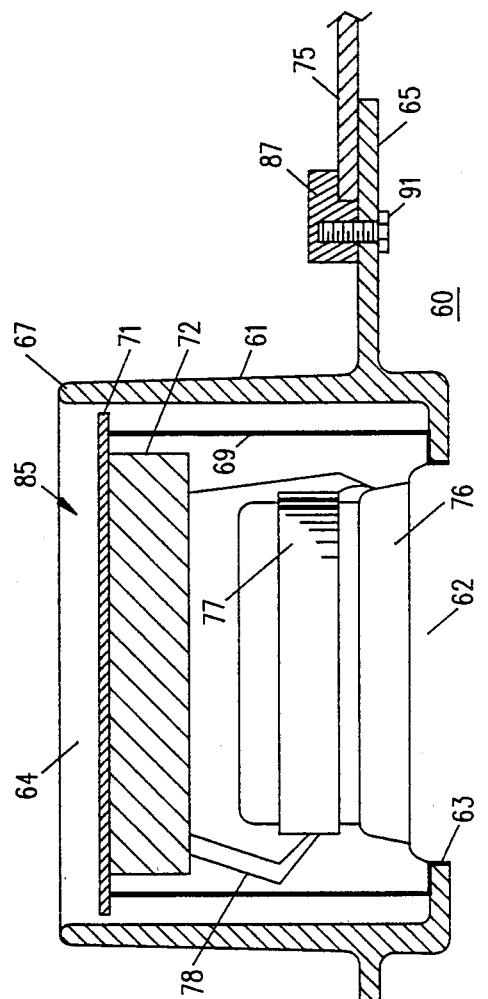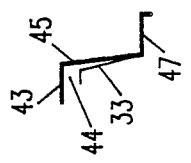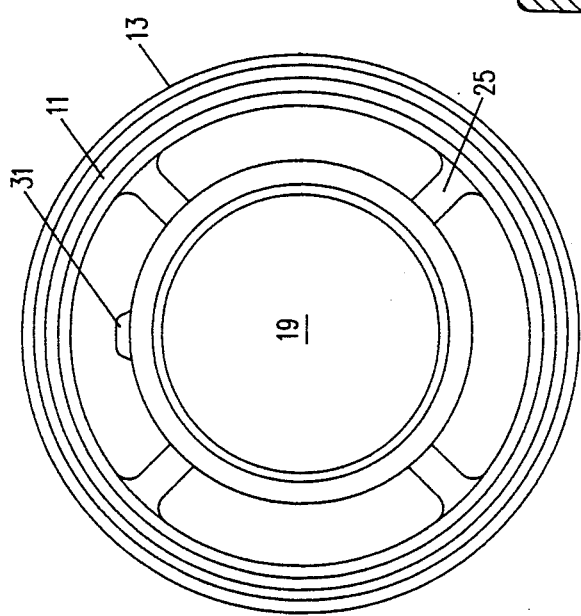

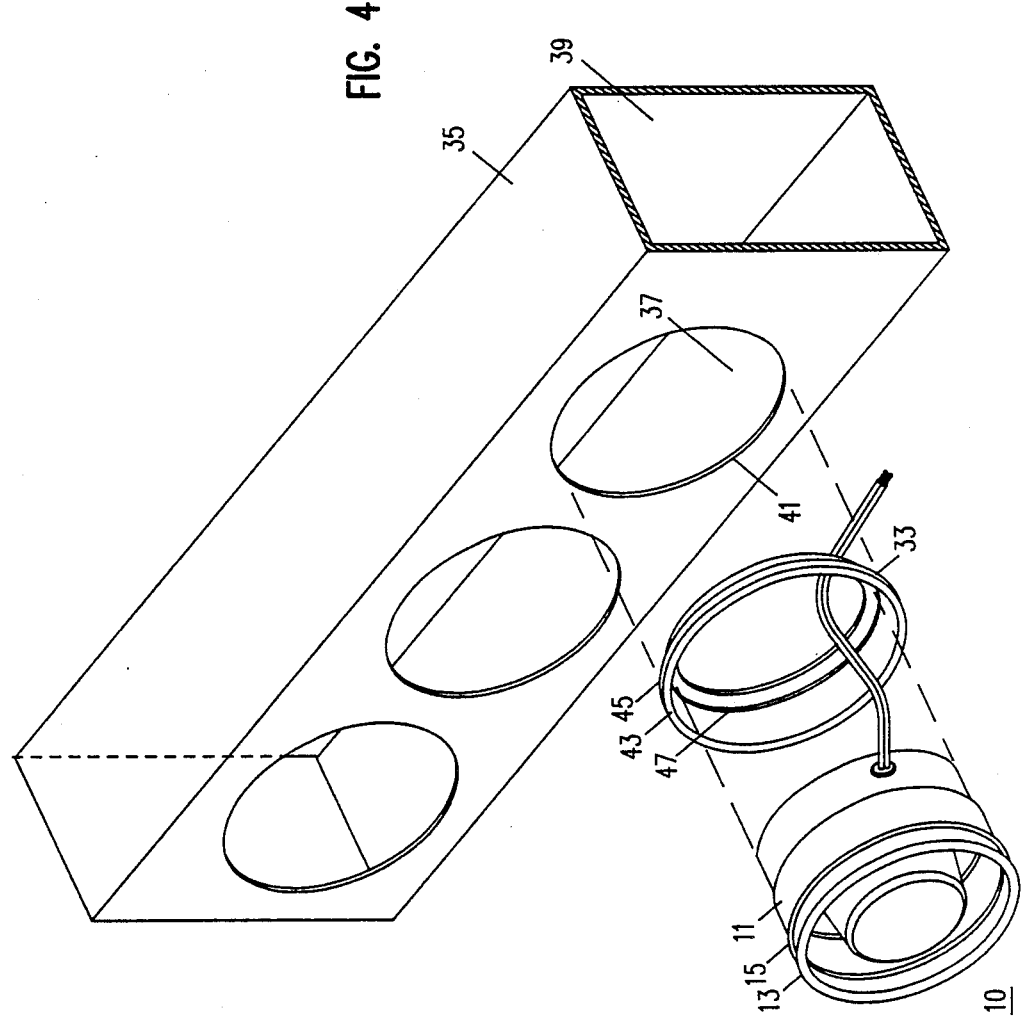

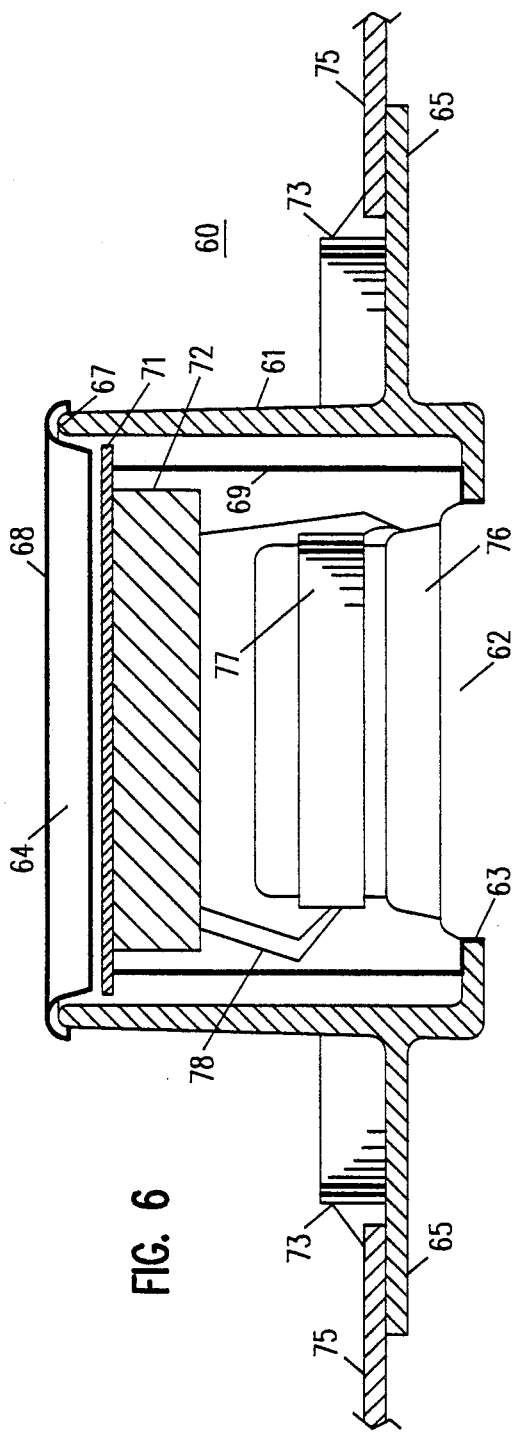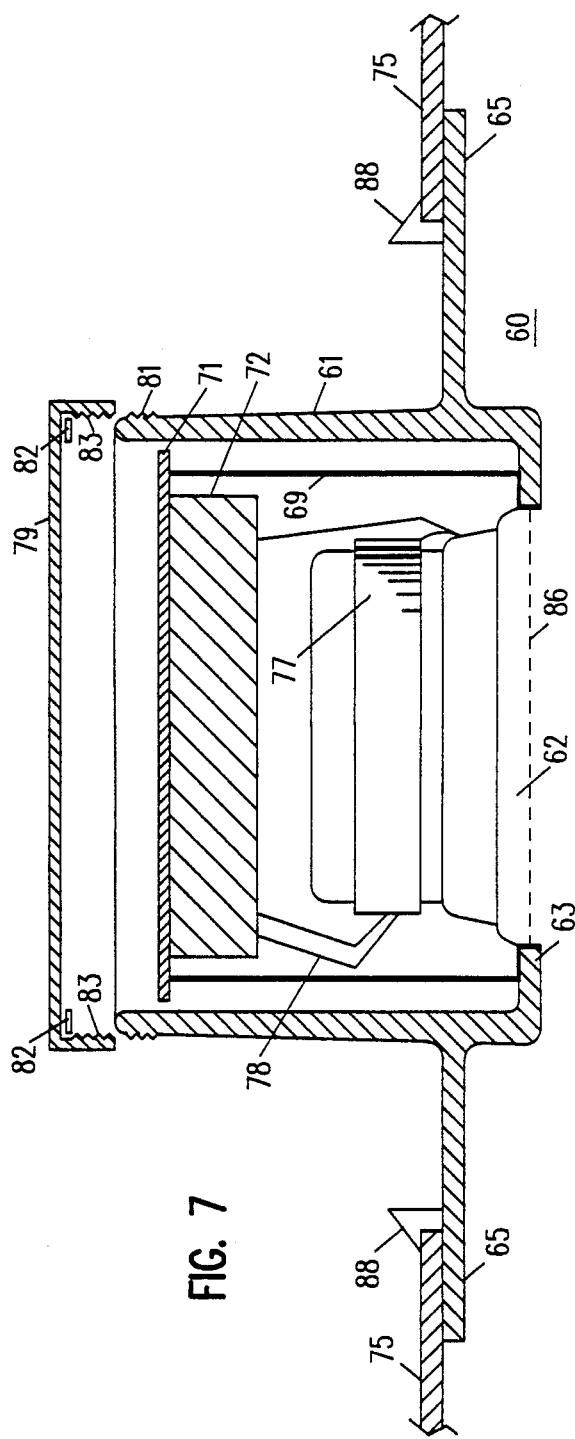

SNAP-IN HOUSING FOR BACKUP ALARM

BACKGROUND OF THE INVENTION

The present invention relates generally to a new and improved housing for vehicle backup alarms and the like and, more particularly, to a removable, snap-in housing for mounting a modular backup alarm on a vehicle chassis or other structural member in standard sized receptacles.

Backup alarm devices are required for mobile construction, mining and industrial equipment. For example, the Department of Labor, Occupational Safety and Health Standards requires any motor vehicle having an obstructed view to the rear be equipped with a reverse signal alarm which is audible above or distinguishable from the surrounding noise level. Most city and state vehicle codes require that self-propelled vehicles (with certain exceptions) be equipped with a reverse signal alarm which operates automatically when the vehicle begins backward motion and emits an audible alarm which is distinguishable from, and loud enough to exceed the ambient noise level of other vehicles and noise sources in the immediate area.

Both mechanically operated and electrically operated backup alarm devices are available for such vehicles and other equipment to provide an audible alarm to warn persons in the immediate area that the vehicle is backing. Prior art electrically operated backup alarms, such as the backup alarm described in U.S. Pat. No. 4,603,317 issued to Gailbreath et al, include mounting brackets or flanges having mounting bolt holes for mounting the alarm, rearwardly facing on, at or near the rear of the vehicle. Typically, mounting of the prior art backup alarm requires drilling several holes in the vehicle chassis or other structural member, such as the rear bumper, and bolting the backup alarm to the vehicle. Further, when mounted in easily accessible and convenient locations on the vehicle, the backup alarm may protrude from the body of the vehicle posing a hazard to personnel working on and about the vehicle; or the backup alarm may impede the operation of certain features of the vehicle, the operation of a truck mounted hydraulic hoist for example.

SUMMARY OF THE INVENTION

A backup alarm housing constructed in accordance with the principles of the present invention includes a tubular body having mounting means at the front thereof. The mounting means is adapted to cooperate with the edges defining a preformed hole in a vehicle rear bumper or other vehicle structural member to allow the alarm housing to be readily inserted into the hole and securely held in place. The mounting means comprises deformable resilient locking means which snap into place and thus no special tools are required for installation. A second embodiment includes rotatably mounted locking lugs to which a twisting force is applied by a screw driver or wrench from the front of the backup alarm housing. The backup alarm speaker or other sound generating means and its associated electronics are mounted within the tubular body. The front of the alarm housing is flush with the surface of the vehicle bumper and the housing body is entirely within the cavity formed by the bumper or other vehicle structural member. The front of the alarm housing generally faces to the rearward of the vehicle and is typically left open. The front of the alarm housing may be covered, such as with speaker screen, to protect the alarm speaker. The backup alarm is modular having all of the electronics on a single printed circuit board which is mounted within the housing body at the rear end behind the speaker assembly In a first embodiment the printed circuit board and the rear end of the housing is sealed in epoxy to keep out dust and moisture and reduce vibration. A second embodiment provides for the rear of the alarm housing to be open and the printed circuit board to be accessible in order to change out the electronics to allow the features of the alarm to be changed as desired. The housing may be fabricated as an integral unit from an electrical conductive material to provide a self-grounding backup alarm housing.

BRIEF DESCRIPTION OF THE DRAWINGS

FIG. 3 is a front view of the backup alarm shown in FIG. 1;

FIG. 4 is a perspective view illustrating the installation of the backup alarm housing in a vehicle rear bumper;

FIG. 5 is a perspective view taken in section of the rubber mounting grommet shown in FIG. 4;

FIG. 6 is a side view taken in section of a backup alarm housing constructed according to a second embodiment of the present invention;

FIG. 7 is a side view taken in section of the backup alarm housing shown in FIG. 6 with a screw-on rear cover; and FIG. 8 is a side view taken in section of the backup alarm housing shown in FIG. 6 with no rear cover.

DETAILED DESCRIPTION

Figure 1:
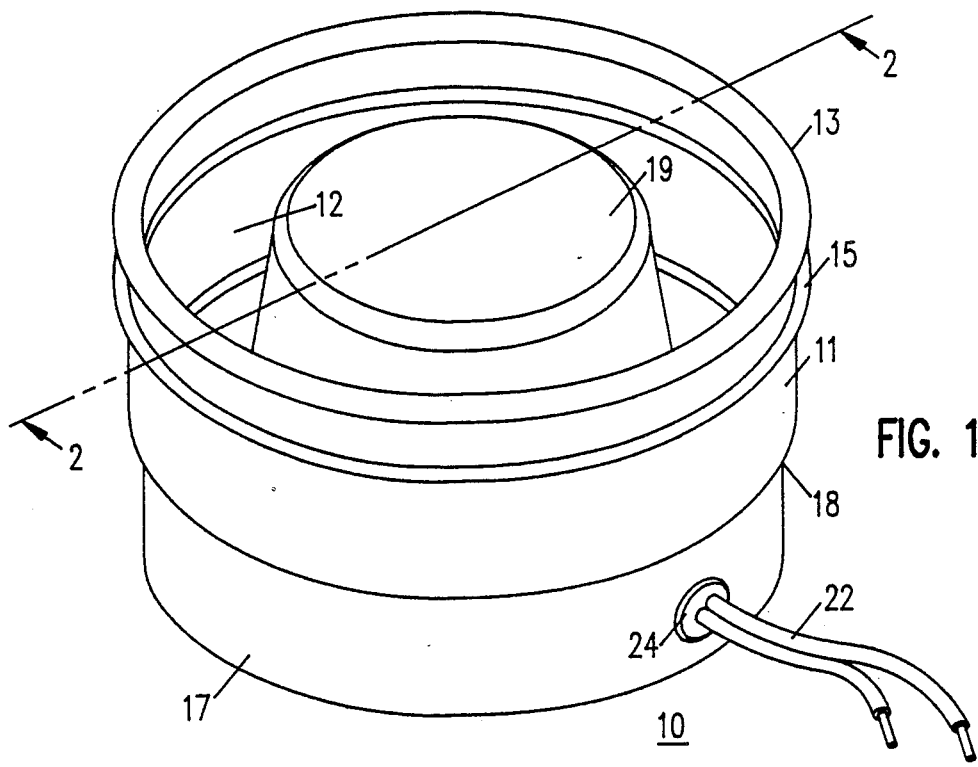
FIG. 1 is a perspective view from the front of a backup alarm housing constructed according to one embodiment of the present invention.
Figure 2:
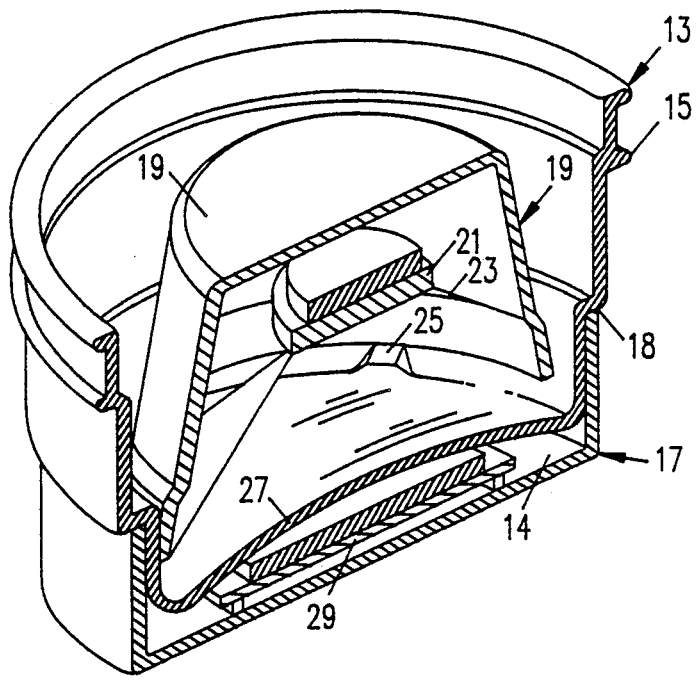
FIG. 2 is a perspective view in section of the backup alarm housing shown in FIG. 1.

Referring now to FIGS. 1, 2 and 3, a first preferred embodiment of a backup alarm housing 10 constructed according to the principles of the present invention is shown The alarm housing 10 comprises a generally round, cup-shaped body 11 having an open front end 12 and a closed, inwardly concave bottom 27 at its rear end. A shoulder 15 extending generally about the outside circumference of the housing body 11 near the front end 12. There may also be a slight lip or flange 13 extending radially outwardly from the peripheral of the open front end 12 of the housing body 11. A generally cup-shaped speaker cover 19 is mounted within the alarm housing 11 on mounting pads or lugs 25. The speaker cover 19 is mounted inverted with its open end facing the concave alarm housing bottom 27 and is spaced away from the housing body bottom 27 leaving an open space between the open end of the speaker cover 19 and the interior walls and bottom 27 to form an echo chamber or cavity. A speaker 21 is mounted within the speaker cover 19, the speaker cone 23 facing the concave bottom 27 of the housing body 11. The rear cover 17 is installed over the rear end of the alarm housing abutting shoulder 18 and is glued or otherwise secured in place by suitable means. The cover 17 is of sufficient dimensions to provide cavity 14 when it is installed on the rear end of the housing body 11. A printed circuit board 29 is mounted within the cavity 14 and includes all of the necessary electronics in modular form to operate the backup alarm. A pair of electrical leads 22 routed through a hole 24 in the side of the housing body rear cover 17 provide electrical connections to a vehicle power system and grounding of the alarm. The printed circuit board 29 is connected to the alarm speaker 21 through an electrical connection point 31 on the side of the speaker cover 19. The backup alarm components and all electrical connections are potted with and coated with epoxy to prevent entry of dirt and moisture and minimize vibration.

The circuitry and other components of electrically operated backup alarm devices are well-known in the prior art and will not be discussed in detail here One such electrically operated backup alarm suitable for use with the alarm housing 11 includes selectable lower and higher loudness levels and an automatically adjustable loudness level and is described in the previously cited U.S. Pat. No. 4,603,317, hereby incorporated by reference. The speaker 21 may be an electromagnetic speaker or other well-known audio transducer, such as a piezoelectric transducer.

The alarm housing rear cover 17 may be permanently attached to the housing body 11 by gluing or other suitable means and filled with epoxy thereby encapsulating the electronics module and printed circuit board 29 to protect against dirt and moisture. Alternatively, the housing body rear cover 17 may be removeably attached to allow access to the printed circuit board 29 to facilitate changing the electronics module to provide a backup alarm having different and selectable characteristics and adding features to the alarm performance. For example, an electronic module providing a single, non-selectable noise level and tone frequency may be replaced by a different electronic module to provide an alarm having selectable noise levels and adjustable tone frequency.

The alarm housing body 11, rear cover 17 and speaker cover 19 may be fabricated from any suitable material such as steel, ABS plastic or fiberglass reinforced nylon. Painted steel housings are more suitable for rugged, heavy duty applications, construction equipment for example, while the plastic and nylon housings fabricated utilizing injection molding or vacuum forming processes are more suitable to light duty use in medium to low noise environments such as encounter by trucks, buses and delivery vans.

Referring now also to FIGS. 4 and 5, the backup alarm housing 10 is removeably mounted in preformed, standard sized holes 37 cut in vehicle structural members such as a tubular bumper 35 of the type utilized by trucks and truck-trailer combinations. Typically, several standard sized holes 37, 4½ inch diameter for example, will be cut or formed in the vehicle bumper 35 at the time of manufacture to allow installation of modular tail lights and signal lights or other units. A Z-shaped 0-Ring or grommet 33 of rubber or other suitably resilient material having an internal shoulder or lip 47 is slipped over the alarm housing body 11 from the rear end until the housing body shoulder 15 is seated against the grommet internal lip 47 and the externally flanged grommet rim 43 is flush with the front end 12 of the housing body 11. The alarm housing 11 and the mounting grommet 33 are then inserted through the hole 37 until the open end 12 of the alarm housing is flush with the external surface of the bumper 35 and the housing body 11 protrudes into the cavity 39 formed by the tubular bumper 35. A radially outwardly extending flange 45 is formed on the grommet 33 adjacent to but spaced apart from the flanged rim 43 to form a slot 44 about the exterior circumference of the grommet 33. When the alarm housing 11 and grommet 33 assembly is inserted through the preformed hole 37, the bumper lip 41 or defining hole 37 compresses or deforms the flange 45 allowing the backup alarm 10 to be fully inserted through the hole 37. When the backup alarm 10 is fully inserted, the flange 45 "snaps" back to its original configuration and the backup alarm is held securely in place by the lip 41 in the grommet slot 44. The backup alarm may be removed by reversing the above procedure. A rubber grommet identified as model 40700 manufactured by Truck-Life Co. Inc. of Jamestown, N.Y., is suitable for this purpose.

Referring now to FIGS. 6, 7 and 8, a second preferred embodiment of a backup alarm housing 60 constructed in accordance with the principles of the present invention is shown. The backup alarm housing 60 comprises a tubular body 61 having open front and rear ends 62 and 64, respectively. The tubular body 61 is preferably round, but may be of any suitable shape and dimension, square for example The housing body 61 front end 62 has a radially inwardly extending flange to form the peripheral rim 63 to facilitate mounting of the alarm components within the housing body 61. A radially outwardly extending mounting flange 65 is formed near the front end 62 about the external circumference of the housing body 61 to facilitate mounting the alarm housing 60 to a vehicle bumper or other structural component 75. The alarm electrical components include the speaker 77, and a printed circuit board 71 having an electronics module 72 mounted thereon. The speaker 77 is secured to the housing peripheral rim 63 by gluing or some other suitable means. The printed circuit board 71 is mounted on standoffs or supports 69 which are secured to the inside of the housing peripheral rim 63 and extend to the rear end 64 of the housing body 61, Required electrical connections between the electronics module 72 and the speaker 77 are provided by conductors 78. Electrical leads (not shown) from the printed circuit board 71 provide proper grounding of the electrical circuits and connection to the vehicle power supply. The speaker 77 is mounted having the speaker cone 76 facing towards the alarm housing open end 62. Alternatively, the speaker 77 or other sound transducer may be mounted in an echo chamber as described hereinabove. The alarm housing open end 62 may be left uncovered or it may be covered with a protective cover 86, such as speaker screen, to prevent dirt and moisture from damaging the speaker cone 76.

As discussed herein above, the printed circuit board 71 and electronics module 72 may be permanently mounted within the alarm housing body 61 or, alternatively it may be removeably mounted to allow replacement of the electronic module 72 to provide alarms with different characteristics or additional features. In backup alarms having the printed circuit board 71 and electronic module 72 permanently mounted, the open rear end 64 of the alarm housing body may be filled with epoxy 85 (as shown in FIG. 8) encapsulating the printed circuit board 71 and electronic module 72, the speaker 77 and all electrical conductors 78 to protect the alarm components from dirt and moisture and reduce vibrations to a minimum. For backup alarms having replaceable electronic modules 72, the rear end 64 of the housing body 61 must be covered to keep out dirt and moisture An inwardly concave snap-on cover 68 constructed of resilient plastic or metal may be slightly compressed and pressed into place over the rear rim 67 of the alarm housing body 61 (as shown in FIG. 6). Alternatively, the alarm housing body 61 side wall may be threaded near its rear rim 81 and a screw on cover 79 having matching threads 83 may be screwed on and tightened. A circular rubber gasket 82 may be compressed between the housing body 61 rim and the cover 79 to provide an effective seal (as shown in FIG. 7).

A bevelled sectioned locking ring 73 fabricated from a resilient plastic or nylon composite, rubber or metal, is fixedly mounted concentric with the alarm housing body 61 on the rear facing side of mounting flange 65 (as shown in FIG. 6). The locking ring 73 is of suitable dimension to provide a snug fit in standard sized mounting holes pre cut in the vehicle bumper 75 at the time of fabrication. Alternatively, a plurality of bevelled locking fingers 88 may be fixedly mounted on the rear facing surface of the mounting flange 65 disposed in a pattern concentric to the alarm housing body 61, the pattern being of suitable dimension to provide a snug fit in the precut mounting holes (as shown in FIG. 7). To install the backup alarm on the vehicle bumper 75, the alarm housing 60 is inserted rearwardly through the mounting hole, deforming the locking ring 73 or locking fingers 88 radially inwardly until the locking ring 73 or locking fingers 88 snap over the hole edge to hold the alarm housing 61 securely in place To prevent damage to the backup alarm, installation pressure should be applied to the mounting flange only at the mounting hole circumference opposite the locking ring 73 or locking fingers 88.

Referring now to FIG. 8, another means of mounting and locking the alarm housing 60 into place is shown. Mounting lugs 87 positioned in a pattern concentric with the alarm housing body 61 are rotatably mounted on the rear facing surface of the mounting flange 65 by screws or bolts 89 extending through the mounting flange 65, the mounting pattern having dimensions slightly smaller than the dimensions of the mounting hole precut in the vehicle bumper 75. The mounting lugs 87 may be rotated utilizing a screwdriver or wrench in cooperation with the screw or bolt head 91. To install the backup alarm housing 60, the mounting lugs 87 are rotated so that the lug blades 95 are tangential to the mounting hole edge. The backup alarm housing 60 is then rearwardly inserted through the mounting hole and the mounting lugs 87 rotated such that the lug blades 95 extend radially outwardly over the hole edge thereby securely attaching the backup alarm housing 60 to the vehicle bumper 75.

The alarm housing body including the mounting flange 65 and the locking ring 73 or locking fingers 88, respectively, may be constructed of metal, such as steel, or fabricated as an integral unit of plastic or fiberglass reinforced nylon, such as a composite designated Dupont 66 manufactured by the Dupont Company, utilizing an injection molding or vacuum forming process. If a self-grounding alarm housing 60 is desired, a conductive material may also be included in the plastic or nylon composite, a fiberglass-nylon composite including 10 per cent stainless steel fibers for example Since stainless steel fibers concentrate in the middle of the molding, away from the surface of the housing, it is necessary to provide conductive pad or points, brass or copper poles embedded in the mounting flange 65 protruding slightly at the surface where the mounting flange 65 is in contact with the vehicle bumper 75, Utilizing metal, electrically conductive standoffs or supports 69 will provide grounding of the printed circuit board 71 and electronics module 72 to the self-grounding alarm housing. Since the mounting screws 89 extend through the mounting flange 65 in contact with the stainless steel fibers, utilizing mounting lugs 87 fabricated from metal or other electrically conductive material will also provide electrical connection between the self-grounding alarm housing and the vehicle bumper 75. The front end 62 and front facing surface of the mounting flange 65 may also be fabricated of a reflexive material or painted or coated with a reflexive material commercially available from sources such as the Minnesota Mining and Manufacturing Company.

Although the present invention has been described in its preferred forms with a certain degree of particularity, it is understood the present disclosure of the several preferred embodiments has been by way of example and that numerous changes in the details of construction and the combination and arrangements of elements may be resorted to without departing from the spirit and scope of the invention as herinafter claimed.

I claim:

1. A housing for mounting a backup alarm in a mounting hole preformed in a structural member of a vehicle, said housing comprising:
    a tubular body having a front end and a rear end and being open at both ends, the shape of said tubular body being similar to and slightly smaller than said mounting hole, said tubular body including internal mounting means for mounting components of a backup alarm therein; and
    mounting means adapted to cooperate with edges of said structural member defining said preformed mounting hole for mounting and securing said tubular body therein on said structural member.

2. A housing as in claim 1 wherein said mounting means comprise:
    a radially outwardly extending mounting flange attached to and disposed around said tubular body near said front end; and
    resilient locking means attache to the rearward facing surface of said mounting flange, said resilient locking means adapted to cooperated with the edges of said structural member defining said preformed mounting hole for mounting and securing said tubular body therein on said structural member.

3. A housing as in claim 2 wherein said resilient locking means comprises a plurality of locking fingers fixedly attached to said rearwardly facing surface of said mounting flange and disposed in a pattern concentric with said tubular body, each of said locking fingers deforming slightly in response to installation pressure allowing insertion of said tubular body in said mounting hole, each of said locking fingers adapted to engage the edges of said structural member defining said preformed mounting hole holding said tubular body in place when said housing is fully inserted in said mounting hole.

4. A housing as in claim 2 wherein said resilient locking means comprise a sectioned outwardly bevelled locking ring fixedly attached to said rearwardly facing surface of said mounting flange and disposed concentric with said tubular body, said locking ring deforming slightly in response to installation pressure allowing insertion of said tubular body in said mounting hole, said locking ring adapted to engage the edges of said structural member defining said preformed mounting hole holding said tubular body in place when said housing is fully inserted in said mounting hole.

5. A housing as in claim 1 further comprising a rear cover attached to said rear end of said tubular body for enclosing and covering said backup alarm components when mounted within said tubular body preventing entry of dirt and moisture.

6. A housing as in claim 5 wherein said rear cover is removeably attached to said rear end of said tubular body.

7. A housing as in claim 6 wherein said internal mounting means comprise supports adapted for allowing said backup alarm components to be removeably mounted.

8. A housing as in claim 1 wherein said tubular body and said mounting means are molded as an integral unit.

9. A housing as in claim 8 wherein said molded integral unit is fabricated from an electrical conductive material.

10. A housing as in claim 2 wherein said resilient locking means comprise a plurality of locking lugs, each said locking lug rotatably attached to the rearwardly facing surface of said mounting flange, said plurality of locking lugs disposed in a pattern concentric with said tubular body, each said locking lug responsive to a rotary force urging said locking lugs into engagement with the edges of said structural member defining said preformed mounting hole holding said tubular body in place when said housing is fully inserted in said mounting hole.

11. A housing as in claim 10 wherein said each of said plurality of locking lugs are mounted for rotary motion on a shaft, said shaft extending through said mount flange and accessible from the front end of said tubular body for applying a rotary force to said shaft urging said locking lug into engagement with the edges of said structural member defining said preformed mounting hole.

12. A housing as in claim 2 wherein said backup alarm components comprise an audible sound transducer and modular electronic circuitry, said modular electronic circuitry mounted on said printed circuit board.

13. A vehicle backup alarm for removeably mounting in a mounting hole precut in a vehicle structural member, said backup alarm comprising:

a generally round cup-shaped housing being open at a front end thereof and closed at a rear end thereof;
a sound transducer fixedly mounted in said housing;
a rear cover fixedly attached to said rear end of said housing, said rear cover defining a cavity therein between said rear cover and said rear end;
a printed circuit board mounted within said cavity, said printed circuit board including the electronic components for operation of said backup alarm, said printed circuit board electrically coupled to said sound transducer; and
mounting means adapted to cooperate with edges of said structural member defining said mounting hole for removeably mounting and securing said backup alarm on said structural member in said mounting hole.

14. A backup alarm as in claim 13 further including a transducer cover mounted in said housing and covering said sound transducer.

15. A backup alarm as in claim 14 wherein said closed rear end of said housing is inwardly concave-shaped, said transducer cover disposed in spaced relationship with said closed rear end forming an echo chamber therebetween.

16. A backup alarm as in claim 13 wherein said mounting means comprises an annular grommet adapted to cooperate with said housing and the edges of said vehicle structural member defining said mounting hole for removeably mounting and securing said backup alarm on said structural member and in said mounting hole.

17. A backup alarm as in claim 16 wherein said housing includes an external shoulder formed thereon, said annular grommet including a radially inwardly extending flange for cooperation with said external shoulder retaining said housing therein.

18. A backup alarm as in claim 17 wherein said annular grommet includes a pair of external flanges, said external flanges disposed in spaced-part relationship, said external flanges slightly deformed in response to installation pressure such that the edges of said structural member defining said mounting hole are positioned between said pair of external flanges when said housing is fully inserted in said mounting hole.

19. A backup alarm as in claim 13 wherein said cavity is filled with epoxy when said printed circuit board and said rear cover are installed.

20. A backup alarm as in claim 13 wherein said rear cover comprises a tubular extension, said tubular extension forming a cavity therein, said cavity being filled with epoxy when said printed circuit board is installed therein.

* * * * *